United States Patent Office 3,325,927
Patented June 20, 1967

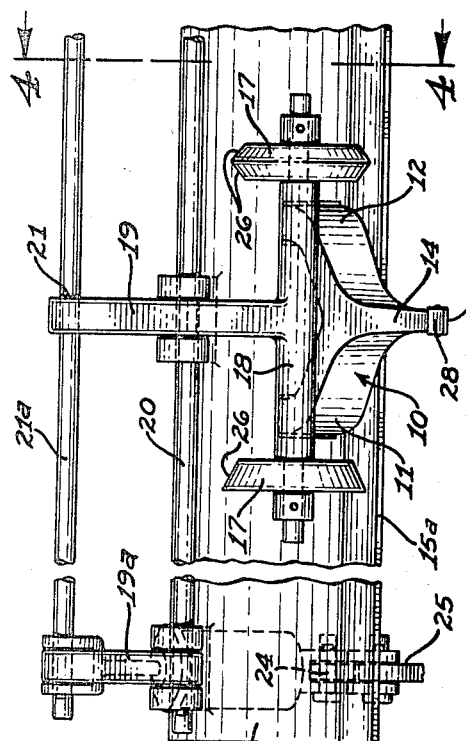
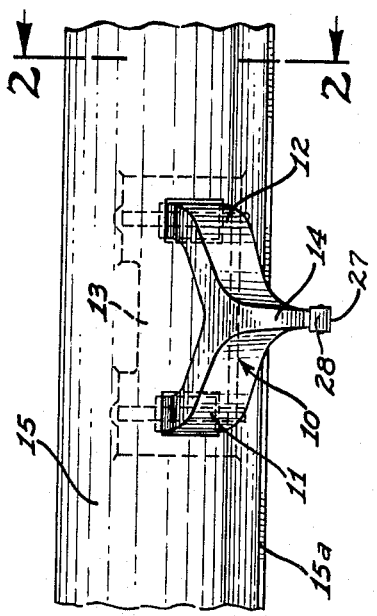
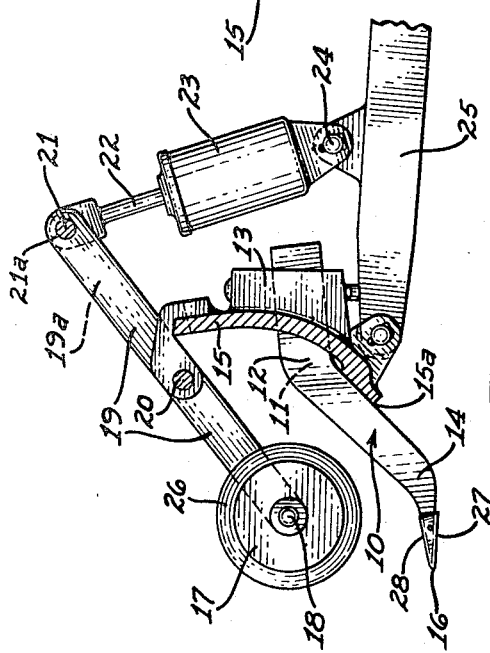
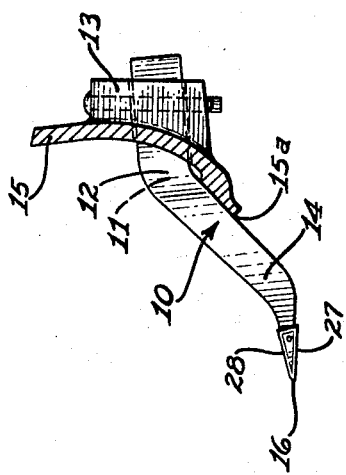
INVENTOR.
HENRY A. MULLIN.

3,325,927
FRONT END RIPPER ATTACHMENT FOR
BULLDOZER
Henry A. Mullin, 1140 Alameda Road NW.,
Albuquerque, N. Mex. 87114
Filed Nov. 16, 1964, Ser. No. 411,485
4 Claims. (Cl. 37—145)

ABSTRACT OF THE DISCLOSURE

A front end ripper attachment for the moldboard of a bulldozer cooperating with a pavement breaker for efficiently maintaining maximum effort of the tractor under rugged operating conditions.

---

This invention pertains to improvements in front end ripper attachments for bulldozers and the like.

This invention is related to improvements in apparatus such as set forth in my Patents No. 2,716,823, issued Sept. 6, 1955, and No. 2,817,168, issued Dec. 24, 1957.

The draft type or rear tractor mounted rippers are limited in their ability to break up some types of slab rock formations as well as handle large boulders and break up old pavement. Under certain conditions large pieces of rock will become caught between the tooth shank and the back of the tractor.

Conventional rear tractor mounted rippers have the inherent disadvantage of having a relatively short ripper point. This is partly due to the mounting characteristics on the rear of the tractor because of which a great deal of efficiency is lost as the short length of the point is limited in using the wedging action of a longer tooth shank and point which can be used in a front mounted tool. The rear mounted ripper shank and point is restricted in its length by the vertical clearance needed at the rear of the tractor. If the shank and point were made longer it would raise up under the tractor and be vulnerable to side bending as the tractor can be turned with the ripper in action.

Other problem areas relating to the rear mounted tooth design are: Since the tooth point angle is not adjustable from the operator's seat, and since no provision is made to neutralize the forces on the top and bottom of the digging point the top of the tooth is pitched at a steep angle which in turn creates terrific down suction, thus keeping the tooth shank under extreme tension; since in turn, the ripper being solidly connected to the tractor forces the back of the tractor downward; these forces are set up as the tractor travels forward which results in down pressure on the rear and lifting forces raising the front, thus reducing the perfect ground contact of the track which causes loss of traction.

Still another disadvantage of the rear mounted single tooth ripper is that the tooth cannot be positioned close to a bank as the tooth must be positioned directly in the center of the tracor in order to avoid bending the shank and to get maximum force concentration on the point. This results in the tractor track running against the bank with the tooth some four feet distance from the work.

Still another inherent weakness is that the operator cannot observe what takes place when the tool hits a large boulder resutling in either stalling the machine or sliding over the boulder. In turn these operating characteristics are costly to the owner as efficiency is impaired.

One of the objects of the front end ripper of this invention is to provide much more maneuverability and the operator can observe the work to a better advantage. Another object is that ripping close to a bank can be accomplished in one of two ways, a single outside tooth on the front end ripper can be pushed directly into a bank, or a front end ripper with a shank positioned on the extreme corner of the dozer moldboard can exert maximum power on the one tooth if the operator slopes the traction surface for the tractor into the bank, using the force of gravity, acting to oppose the forces which tend to move the rear of the tractor outwards, thereby avoiding pivoting the tractor. If this is not done, the amount of force concentration available on the ripper point is limited to the force required to pivot the tractor, resulting in the rear of the tractor moving outward.

Still another object is to provide a single tooth front end ripper that can be pushed directly into a bank or at an angle to the bank.

It is also an object to provide a ripper performing the work in front of the tractor having many advantages over rear mounted tools which may be summarized as follows:

(1) Controlled suction of the tooth as taught in the cited Patent No. 2,817,168 above.

(2) Suction has no effect on traction when tooth angle is in neutral position.

(3) The ability to tilt the moldboard from the operator's position to the right or left and to control the suction of a single tooth or all four teeth to provide the flexibility to concentrate all the forces available through traction available on a single tooth, by tilting the moldboard or on any number of teeth.

(4) Additional traction is available by positioning the tooth at a steep angle which forces the teeth or tooth downward, in turn opposing this force by balancing an upward force on the dozer moldboard to pull the front of the tractor down and then transfer these forces to the tracks, an ideal feature in pioneering a road in the mountains.

(5) Maximum force concentration is available on a tooth extending beyond the tracks by providing suction into the work footing for the tractor, thus taking advantage of gravity stabilizing these forces so the rear of the tractor will not pivot away from the work to maintain maximum traction and in turn maximum force concentration on the tooth point.

(6) A longer inclined plane on the top of the tooth and point is available making it possible to take advantage of the power of a wedging action without these forces being transferred to the tractor.

(7) The characteristic of slab rock, boulders, or pavement becoming lodged between the tooth shank, ripper structure, and the back of the tractor is completely eliminated on the front end ripper as the tooth shank has no structure above it.

Modern methods of road and other construction projects require that a large portion of the material be moved long distances, and this in turn for best efficiency requires the material to be loaded and hauled by rubber-tired self-loading scrapers. Scrapers are limited in their ability to load certain materials without first loosening it by rippers. The prime purpose of the structure of the above recited patents was to increase the penetrating ability over conventional bulldozers which was accomplished by increasing the force concentration over the entire width of the moldboard cutting edge by providing four long slender teeth which due to the combination of the features in the above referred-to patent provided an increase in force concentration of thirteen to one per linear inch. This feature made it possible to use the full width of the moldboard more hours than conventional dozers which would be forced to use a portion of the blade in order to loosen the material, or in extreme cases resort to ripping, thus taking more time to move the material. In addition to this, the long slender tooth made it possible to surface large rocks easily, and when digging is required with one tooth the long slender wedge-shaped tooth would penetrate and wedge material apart rather than depend on a relatively blunt moldboard end bit, which provides only a scraping action. In this case the force concentration on a three inch wide digging point, compared to the full width of the dozer cutting edge, is in a ratio of 52 to one. A tractor operating at practically a stall speed of .5 mile per hour developing one hundred thirty thousand pounds draw bar pull with traction provides a tremendous force concentration which will loosen most materials short of solid hard rock. These features go to make up an efficient pioneer or short haul machine.

In order to utilize the features of the above recited patents on more difficult job applications where scraper hauling is required a specially constructed front end ripper of the instant case is provided. In order to provide the conversion from a bulldozer to a ripper there is provided longer teeth extending below the cutting edge, eight to sixteen inches depending on the size of the tractor, which in turn determines the amount of power needed to do the work. This conversion, where the job application can be done with a ripper of four teeth, provides a concentration on a 130,000 dbpp. tractor of 10,820 lbs. per linear inch. It is important to point out here that this force concentration compared to the full width available on a conventional dozer is only 807 lbs. per linear inch. In harder to work material the two outside teeth can be removed and the material loosened with a force concentration of 21,640 lbs. per linear inch. In the event the most severe material were to be ripped, requiring the full force concentration of the largest tractor on a single tooth point, a heavy duty single tooth front end ripper would be installed, thus taking advantage of the maximum force conentration available of 130,000=43,333 lbs. per linear inch.

Further features and advantages of this invention will appear from a detailed description of the drawings in which:

FIG. 1 is a fragmentary front elevation of a heavy duty front end ripper tooth for a bulldozer moldboard.

FIG. 2 is a side elevational sectional view of the apparatus shown by the line 2—2 in FIG. 1.

FIG. 3 is a front elevation showing a slab rock and pavement breaker on the moldboard associated with the front end ripper.

FIG. 4 is a side elevational sectional view of the apparatus shown by the line 4—4 in FIG. 3.

As an example of one embodiment of this invention, there is shown an attachment comprising a center single tooth ripper 10 supported by two shanks 11 and 12 which are inserted into the two laterally spaced tooth boxes 13 of the moldboard 15 of a bulldozer such as shown in the above referred-to patents in place of the conventional two intermediate teeth. This attachment is an integral structure and may preferably be made by forging or a combination of forging and welding, and by fabricating and welding, or by steel casting.

For a detailed description of the structure, refer to FIG. 1 in which is illustrated the above single tooth ripper 10 which is an integral structure comprising the two integral laterally spaced shanks 11 and 12 which may be mounted in a manner such as provided in my above patents.

From the two shanks 12 and 13 the structure flows integrally into a single tooth shank 14 which extends various distances below the dozer moldboard cutting edge 15a. The double base mounting 11–12 provides great rigidity and stability to the structure.

The distance the tooth point 16 protrudes in front of and below the moldboard is determined by the various size tractors and the type of work to be accomplished. In work on slab rock or ripping up old pavement a long shank 14 extending a long distance would be selected so as to provide a long gradual taper to lift and break the rock. However, if solid mass soft rock, such as sandstone, were to be ripped a shorter shank would be selected.

In order to provide a rock or pavement breaker, FIGS. 3 and 4, two crusher wheels 17 are straddle mounted each side of the tooth shank 14 journaled on a shaft 18 on the outer end of a lever arm 19 which is pivoted on a rock shaft 20 carried on top of the dozer moldboard 14 providing a fulcrum intermediate the ends of the lever arm 19. The other end of the lever arm extends beyond the fulcrum 20 any suitable distance and is pivotally connected at 21 to a shaft 21a to which is also connected a piston rod 22 of a hydraulic cylinder 23 which is pivotally attached at 24 to the moldboard side arms 25 and which through a moldboard connecting line 19a supplies the means for raising and lowering the crusher wheels 17 and supplying any predetermined required pressure on these wheels. The crusher wheels 17 have tapered rims 26 rising from the outside width to the center forming a sharp cutting edge on one side or in the center, so as to provide a high degree of force concentration on top of the pavement or layer of rock. This would break the rock if the rock or pavement were elevated in a solid mass by the tooth shank 14 which would be forced under the rock by the tractor. The hydraulic power would be controlled from the operator's seat and would be arranged to provide a hammer action to break the rock when necessary.

While the wheeled rock breaker described is primarily intended to be attached to a bulldozer, the single tooth ripper with the wheel rock breaker may be attached to any suitable individual wheeled or tracked vehicle with its own self contained hydraulic power and pushed into the work. Wheels may be removed and skids or hammers installed to meet operating conditions.

In the preferred form of the invention, a plurality of laterally spaced teeth are mounted in the mold-board as in the above recited patents extending below the dozer cutting edge four to twelve inches and forward a greater distance, thus forming an inclined plane starting at the variable suction removable digging point and upward toward its base of support, through the dozer blade and secured as covered in Patent No. 2,716,823, thus creating a variable angle on the inclined plane formed by the top surface of the tooth shank and point which are adjustable from the operator's seat, making it possible to loosen the earth and not move it.

Further, there is provided means of sideways tilting the dozer, as in Patent No. 2,817,168, which can be raised straight up and down by conventional means, as a means of causing one ripper tooth to be lowered to a working position, with the other raised, enabling the operator to engage one ripper tooth and point into the work to be done loosening the earth without moving it.

There is also provided single tooth ripper supported by two shanks flowing from the tip of the variable suction digging point removably attached to said shank around contacting end, the top of said shank forming a variable gradual incline plane; the structure of said shank dividing into two supporting shanks flowing from the tip of the digging point, laterally and upwardly, the bottom of the divided shank bing supported by contacting a dozer moldboard or the cutting edge of said moldboard or other supporting structure, and said terminating through said dozer moldboard or similar structure and secured in said structure or moldboard by means taught in the arts of Patent No. 2,716,823, thus adding rigidity to the tooth shank in all directions. The twin supports and tooth shank and digging point are adjustable so as to create rapid suction into the earth and to a neutral forward penetrating position of the point where all forces are neutralized by opposing forces acting on the bottom 27 and top 28 of said digging point, causing the tooth point 16 to seek a neutral position under the ground and thus travel at a predetermined level providing a means of rupturing the earth surface with a minimum of power consumption.

There is provided a ripper point bottom ground contacting surface 27 of various widths to provide the means of supporting the down pressure applied on top 28 of said shank and point.

A further purpose is to provide a front mounted tandem wheeled slab rock or pavement cutter or breaker composed of two wheels 17 with sharp ground contacting rims 26, suspended in front of a dozer or a wheeled vehicle which uses an inclined plane-shaped rooter shank and tooth point used to elevate pavement or slab rock for the purpose of removing said rock or pavement. The tandem wheels are mounted on a common axle 18, one on each side of said ripper shank forming a mechanical device to break slab rock or pavement by traction force pushing said shank and point under the pavement or between the seams of slab rock thus raising it as the tooth shank is pushed forward, the rim of the wheels, one on each side of said shank creating an opposing downward force breaking the rock or pavement, said wheels being mounted on an axle long enough to provide various distances apart to change the leverage between the top of said shank and rim of said wheels. The axle containing the wheels is raised and lowered by means of a lever arm 19 attached to the axle having a fulcrum 20 on said dozer and a double-acting hydraulic cylinder 23 acting on the opposite end of the lever arm. Control of the hydraulic cylinder is from the operator position. The rock-breaking wheels 17 may be replaced with a bar type breaker. Wheels or bars are used to provide a hammer action by lifting and dropping or by applying downward force from the hydraulic cylinder 23 through the lever arm 19.

While the description of the machine describes the novel features of this application as they would be used in and in connection with a conventional dozer, the features of this application permit substituting a skeleton structure to support the teeth omitting the moldboard. This can be described as a tool bar with means of mounting vertical teeth in place of the type which are supported through the moldboard.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters patent is:

1. A ripper tooth adapted to be mounted on the front face of a bulldozer moldboard having,
    (A) a demountable digging point,
    (B) a pair of laterally spaced mounting shanks flowing upwardly and rearwardly from said digging point having top surfaces having a changing gradual incline plane of increasing steepness.
    (C) and bottom surfaces on said shanks adjacent said digging point supported by contacting the bulldozer moldboard adjacent the cutting edge thereof.

2. A ripper tooth adapted to be mounted on the front face of a bulldozer moldboard having,
    (A) a demountable digging point,
    (B) a pair of laterally spaced mounting shanks flowing upwardly and rearwardly from said digging point having top surfaces having a gradual increasing incline plane,
    (C) bottom surfaces on said shanks adjacent said digging point supported by contacting the bulldozer moldboard adjacent the cutting edge thereof,
    (D) a slab rock and pavement breaker associated with said laterally spaced mounting shanks including,
    (E) a pair of laterally spaced crusher wheels journaled on a transverse horizontal aixs on the moldboard for vertical movement thereon and straddling said ripper tooth in front of said laterally spaced mounting shanks for said ripper tooth,
    (F) and power means under bulldozer operator control connected to relatively move said crusher wheels and said ripper tooth top inclined surface.

3. A ripper tooth adapted to be mounted on the front of a bulldozer having,
    (A) a tool bar,
    (B) a demountable digging point,
    (C) a pair of laterally spaced mounting shanks flowing upwardly and rearwardly from said digging point having top surfaces with a variable gradual incline plane of increasing steepness,
    (D) and bottom surfaces on said shanks adjacent said digging point supported by contacting the bulldozer tool bar.

4. A ripper tooth adapted to be mounted on the front of a bulldozer tool bar having,
    (A) a demountable digging point,
    (B) a pair of laterally spaced mounting shanks flowing upwardly and rearwardly from said digging point having top surfaces with a variable gradual incline plane of increasing steepness,
    (C) bottom surfaces on said shanks adjacent said digging point supported by contacting the bulldozer tool bar adjacent the lower edge thereof,
    (D) a slab rock and pavement breaker associated with said laterally spaced mounting shank including,
    (E) a pair of laterally spaced crusher wheels journaled on a transverse horizontal axis on the tool bar for vertical movement thereon and straddling said ripper tooth in front of said laterally spaced mounting shanks for said ripper tooth,
    (F) and power means under bulldozer operator control connected to relatively move said crusher wheels and said ripper tooth top inclined surface.

References Cited

UNITED STATES PATENTS

| | | | |
|---|---|---|---|
| 2,235,913 | 3/1941 | Beane | 37—2 X |
| 2,716,823 | 9/1955 | Mullin | 37—145 |
| 2,817,168 | 12/1957 | Mullin | 37—145 |
| 3,067,989 | 12/1962 | Moench | 37—145 X |

FOREIGN PATENTS 661,914  11/1951  Great Britain.

ABRAHAM G. STONE, *Primary Examiner.*

R. L. HOLLISTER, *Assistant Examiner.*